(No Model.) 3 Sheets—Sheet 1.
E. A. BRANDENBURG.
GATE.
No. 588,544. Patented Aug. 17, 1897.
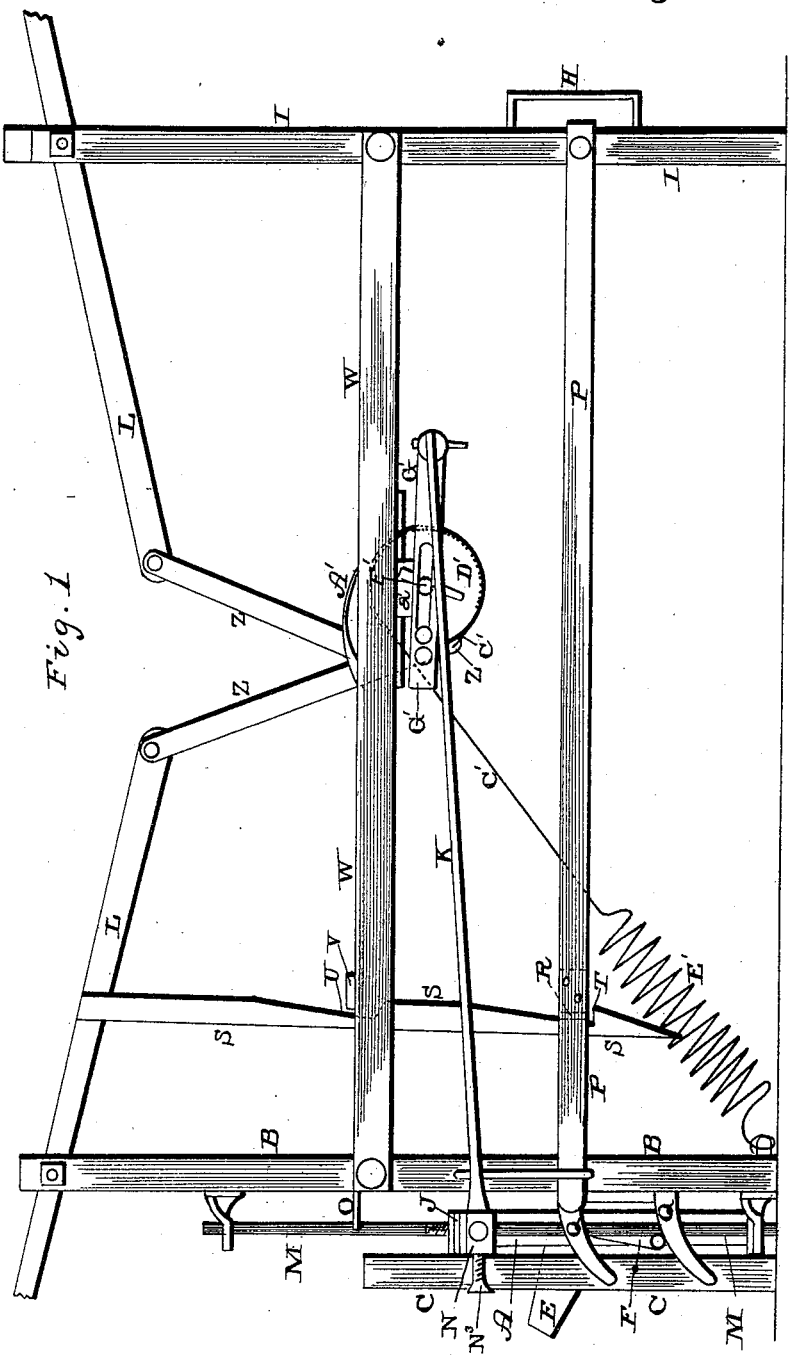
WITNESSES:
Geo. H. Snyder
J. F. Mothershead
INVENTOR
E. A. Brandenburg.
BY
L. G. Susemihl,
ATTORNEY.

(No Model.) 3 Sheets—Sheet 2.
E. A. BRANDENBURG.
GATE.
No. 588,544. Patented Aug. 17, 1897.
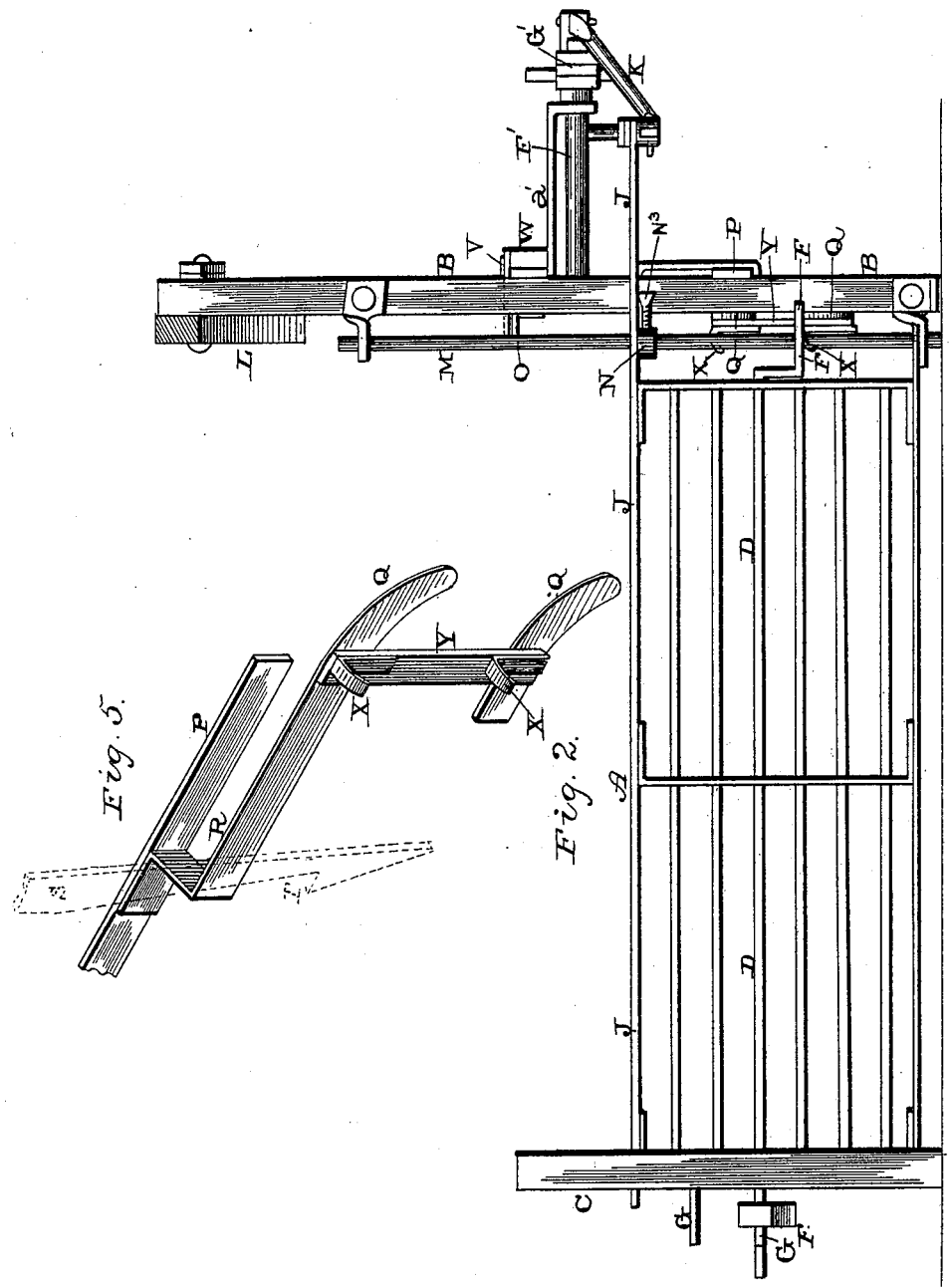
WITNESSES
Geo. H. Snyder
J. F. Mothershead
INVENTOR
E. A. Brandenburg,
BY
L. G. Susemihl,
ATTORNEY.

(No Model.) 3 Sheets—Sheet 3.
E. A. BRANDENBURG.
GATE.
No. 588,544. Patented Aug. 17, 1897.
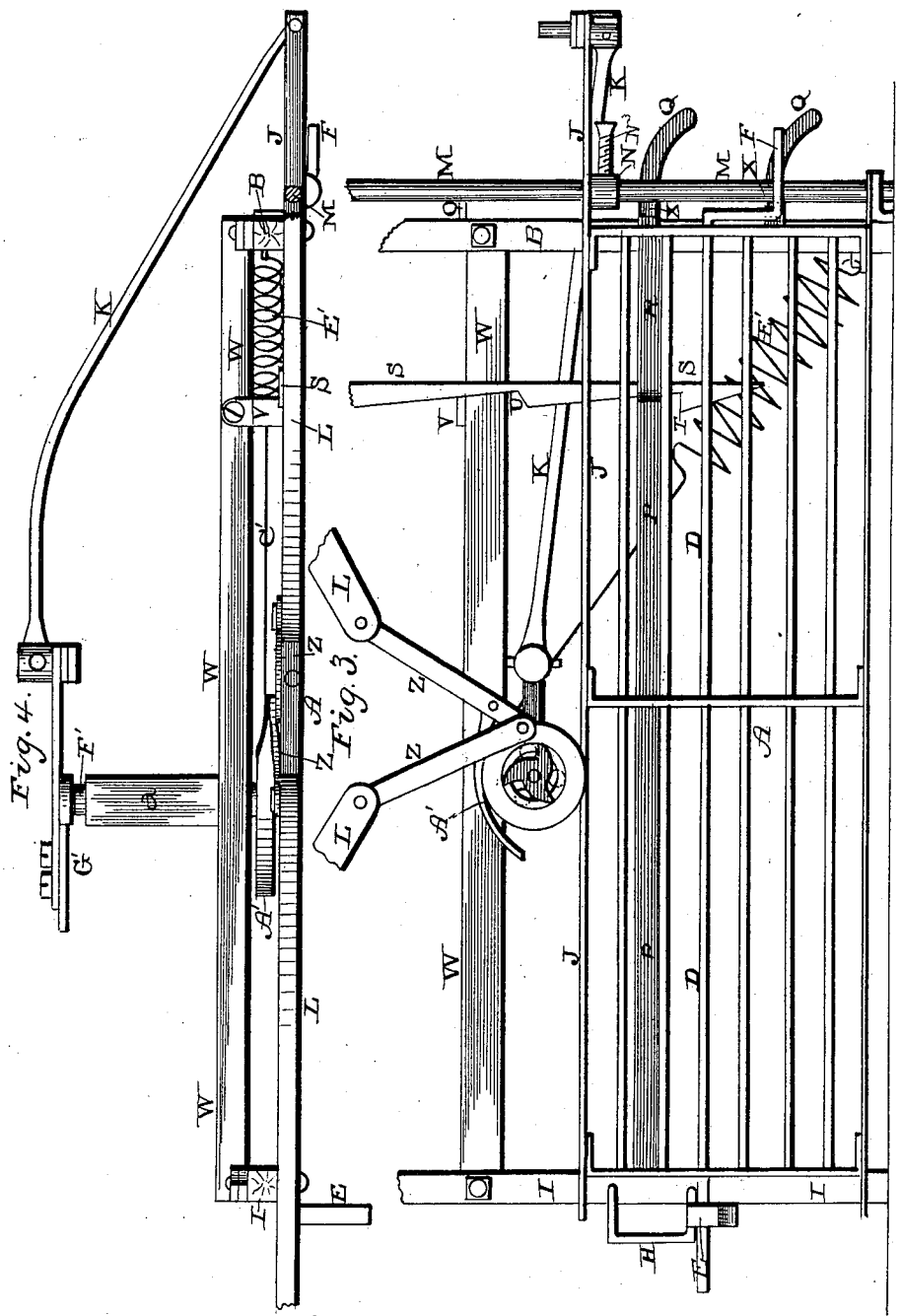
WITNESSES: Geo. H. Snyder
J. F. Mothershead
INVENTOR E. A. Brandenburg
BY L. G. Susemihl
ATTORNEY.

UNITED STATES PATENT OFFICE.

EDWARD A. BRANDENBURG, OF TIPTON, IOWA.

GATE.

SPECIFICATION forming part of Letters Patent No. 588,544, dated August 17, 1897.

Application filed January 18, 1897. Serial No. 619,516. (No model.)

*To all whom it may concern:*

Be it known that I, EDWARD A. BRANDENBURG, a citizen of the United States, residing at Tipton, in the county of Cedar and State of Iowa, have invented certain new and useful Improvements in Gates; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in gates of that variety which are intended to be opened at a distance therefrom; and it consists in the combination and arrangement of parts which will be more fully described hereinafter and pointed out in the claims.

In the accompanying drawings, Figure 1 shows a rear end elevation of the gate and front elevation of the opening and closing mechanism. Figs. 2 and 3 are side elevations of the gate when closed and open, respectively. Fig. 4 is a plan view of the gate. Fig. 5 is a detail view.

A represents the gate, B the post upon which it is hung, and C the post against which it closes. This gate may be formed of metal, as here shown, or of wood in the usual manner, as may be preferred. Extending horizontally along the center of the gate is a partially-revolving rod D, which has a double latch E secured to the outer end and a crank F formed upon its inner one. The latch E is secured eccentrically to the rod and is much heavier at one end than the other, so as to keep the crank F normally in position to be operated by the latch-operating devices. The heavier end of the latch engages with one of the projections G on the post C for the purpose of holding the gate closed, while the other end engages with the catch H on the post I for the purpose of holding the gate open.

The top bar J of the gate projects a considerable distance beyond the inner end of the gate, so as to make connection with the rod K, by means of which the gate is opened and closed when the levers L are operated. This gate A is vertically adjustable upon the rod M, upon which it is pivoted, and upon this rod M is placed a collar N which is vertically adjustable thereon, and which supports the gate when in a raised position. The collar N is secured in any desired position upon the rod M by means of the set-screw $N^3$. When the gate is in its lowest position, it is supported by the adjustable collar N and the lower hinge.

There are two positions in which the gate is intended to operate, one in the position shown and the other when the gate is raised until its top bar J strikes against the stop O on the post B. When in this raised position, the gate will swing freely over snow-drifts or will allow small animals to pass freely back and forth under it in the usual manner. Upon the post C are two projections G, one of which is used when the gate is raised for the latch to catch upon and the other when the gate is in the lowest position.

Hinged upon the post I is the rod or bar P, which has a rising-and-falling movement at its free end, and to which free end is secured the angular loop or plate R, which has its outer end formed into a downwardly-curved projection Q for catching under and operating the crank F upon the latch-rod B when the gate is in a raised position. A second projection Q is also used for the purpose of operating the crank F when the gate is in its normal position, and this second and lower projection Q is connected to the upper one by means of the vertical plate Y, as shown in Fig. 5. Inside of the loop R the lower ends of the elevating-rod S are made to catch when the latch is to be operated for the purpose of opening the gate. This rod S is secured to that lever L which is next to the gate and is provided with a shoulder T, which catches against the under side of the loop R and raises the rod or bar P for the purpose of operating the latch-rod D. In the same edge of the elevating-rod S is formed a notch U, the sides of which are inclined or placed at an obtuse angle to each other and in which notch the flat plate V, secured to the cross-rod W which unites the two posts B I, catches. When one of the levers L is depressed at its outer end, this lifting device S is raised and its shoulder T, catching under the edge of the loop R, raises the rod P and causes the projection Q to operate the crank on the inner end of the latch-rod D until the projection V on the rod W hits against the lower edge of the notch U, and then the lifting-rod S is forced backward, so as to release the rod P, which drops from its own weight. As soon as the lever L is released its lower end sinks, carrying the elevating-rod with it, and after the lower end of the notch U has passed the projection the rod swings forward against the inner end of the loop R and automatically engages again therewith.

The projections Q operate the latch-rod when the gate is closed, but in order to operate it when the gate is open the two curved projections X are secured to the vertical piece Y, which connects the two projections Q, and these two projections X rise and fall with the rod T in the same manner as the projections Q, and by catching under the crank on the end of the rod D when the gate is open raise the crank and cause the rod D to turn for the purpose of operating the latch.

To the inner end of each of the levers L is secured a connecting rod or plate Z, and these rods are pivoted or loosely connected at their lower ends, and to one of them is secured a curved plate A', which projects over the top of the pulley and protects it and the wire or the chain which passes around it from the weather. To the lower end of these rods or plates Z is fastened a cord, wire, or chain C', which passes around the pulley D' and has its outer end fastened to a spring E', as shown. As this cord, wire, or chain C' passes tightly around the pulley D' the slightest upward movement upon the part of the levers L causes the pulley to revolve and by revolving to turn the shaft F', which is placed in suitable bearings $a'$ on the under side of the bar W. In this pulley D' is placed a clutch of any suitable construction, by means of which the pulley is made to operate the shaft F' when turned in one direction, but not when moving in the opposite one. To the opposite end of the shaft F' from the pulley D' is secured an adjustable crank G', which is fastened at its outer end to the rod K, which is connected at its other end to the top bar J of the gate.

Each time that the outer end of one of the levers is depressed the pulley D' is caused to revolve by the movement around it of the cord, wire, or chain C', and this movement of the pulley causes the shaft to turn and through the rod K and crank G' to open or close the gate, according to its position. At the same time that the pulley is being made to revolve the lifting-rod S raises the free end of bar P, and the projections Q or X operate the latch-rod D through the crank upon its inner end. The crank G' is made adjustable by means of a slot in its inner end, so that the distance of the gate can be regulated at will. After the gate is opened by depressing one of the levers L this lever is returned to its original position, the cord C' slipping over the pulley D', so that by again depressing the lever the gate will be closed.

Having thus described my invention, I claim—

1. The gate, a latch-rod extending through it and provided with a latch at one end and a crank at the other; a pivoted rod or bar provided with projections for operating the latch-rod, the operating-levers, and a lifting-rod connected to one of the levers, for operating the bar or rod provided with projections, combined with means for opening and closing the gate, substantially as shown.

2. The gate, a latch-rod provided with a latch at one end and a crank at the other, and the pivoted rod P having a loop formed thereon, and with projections at its free end for operating the crank on the latch-rod, combined with the lifting-rod S provided with a shoulder to engage with the loop on the pivoted rod and having a notch in one edge, a supporting-bar W, the projection V, secured thereto, and the operating-lever to which the lifting-rod is attached, substantially as described.

3. The gate, having its top bar extended beyond its inner end, a connecting-rod attached to this extended end, a crank-shaft connected to the outer end of the connecting-rod and a ratchet secured in the opposite end of the crank-shaft, combined with the operating-levers, plates or rods extending from their inner ends, a wire, cord, or chain connected to the lower ends of the rods and passing around the ratchet-pulley, and a spring connected to the lower end of the wire, cord, or chain, substantially as set forth.

4. The operating-levers, connected at their inner ends by means of rods or plates, the spring-actuated wire, cord, or chain connected to these rods or plates at one end, and a pulley around which the cord, wire or chain passes, combined with a shaft provided with a ratchet at one end inside of the pulley and at its opposite end with a crank, and means for connecting the crank with the gate for opening and closing it, substantially as specified.

In testimony whereof I affix my signature in presence of two witnesses.

EDWARD A. BRANDENBURG.

Witnesses:
C. E. DENMAN,
A. SHAW.